United States Patent
Mathur et al.

(10) Patent No.: US 8,929,536 B2
(45) Date of Patent: Jan. 6, 2015

(54) MULTI-CHANNEL PIVOTING

(71) Applicant: LiveOps, Inc., Santa Clara, CA (US)

(72) Inventors: Sanjay Mathur, Sunnyvale, CA (US);
Kieron Lawson, Whangaparaoa (NZ);
Keith McFarlane, Pleasanton, CA (US)

(73) Assignee: LiveOps, Inc., Santa Clara, CA (US)

( * ) Notice: Subject to any disclaimer, the term of this patent is extended or adjusted under 35 U.S.C. 154(b) by 0 days.

(21) Appl. No.: 14/015,434

(22) Filed: Aug. 30, 2013

(65) Prior Publication Data
US 2014/0064474 A1 Mar. 6, 2014

Related U.S. Application Data

(60) Provisional application No. 61/743,275, filed on Aug. 30, 2012.

(51) Int. Cl.
*H04M 3/51* (2006.01)
*H04L 12/28* (2006.01)
*G06Q 30/00* (2012.01)
*G06Q 10/10* (2012.01)

(52) U.S. Cl.
CPC ........... *H04M 3/5191* (2013.01); *G06Q 30/016* (2013.01); *G06Q 10/10* (2013.01); *G06Q 10/107* (2013.01)

USPC ................................. 379/265.09; 379/265.11

(58) Field of Classification Search
CPC ....... H04L 12/28; H04L 12/56; H04M 3/5191
USPC .......... 370/395.6, 395.51, 229, 235, 238, 461; 379/242, 243, 254, 265.01, 265.09, 379/265.11; 709/240, 242
See application file for complete search history.

(56) References Cited

U.S. PATENT DOCUMENTS

| 6,718,366 B2 | 4/2004 | Beck et al. |
| 7,127,495 B2 | 10/2006 | Brown et al. |
| 7,254,641 B2 | 8/2007 | Broughton et al. |
| 8,428,047 B2 | 4/2013 | Goss |
| 2011/0123015 A1 | 5/2011 | Erhart et al. |
| 2012/0195422 A1 | 8/2012 | Famous |
| 2013/0054339 A1 | 2/2013 | Gupta et al. |

OTHER PUBLICATIONS

International Search Report and Written Opinion, dated Dec. 2, 2013, from corresponding International Patent Application No. PCT/US2013/057703, 7 pages.

*Primary Examiner* — Harry S Hong
(74) *Attorney, Agent, or Firm* — David T. Xue; Duane Morris LLP

(57) ABSTRACT

An method of pivoting a customer among synchronous and asynchronous communications channels during a communication session.

15 Claims, 4 Drawing Sheets

US 8,929,536 B2

MULTI-CHANNEL PIVOTING

RELATED APPLICATION

This application claims priority to U.S. Provisional Patent Application No. 61/743,275, filed on Aug. 30, 2012, the contents of which are hereby incorporated by reference as if set forth in their entirety.

BACKGROUND

Social media and other digital public communication forums are widely adapted by users to communicate with companies and service providers. It is increasingly important for such companies and service providers to optimally allocate resources for handling communications from these channels. Typically, agents who are assigned to handle these communications would respond in the same channel as the original communication from a user. For example, if a user tweets to a service provider via Twitter, the agent would tweet back to the user in response. This approach has some disadvantages. First, the communication remains public and may damage the service provider's reputation. Second, valuable customers who deserve a better service may not be attended to as deserved. Third, most companies and service providers have established best practices and procedures to deal with Voice and Email but have not yet done so for emerging channels.

Thus, a market exists for an efficient multi-channel pivoting among synchronous and asynchronous communication channels during a communication session.

SUMMARY

An exemplary computer-implemented method for pivoting a customer among synchronous and asynchronous communications channels during a communication session comprises: (a) during a communication session with a customer, determining a need to pivot a customer from a first communication channel to a second communication channel; (b) optimally determining one or more eligible communication channels based on data related to the customer, said eligible communication channels including synchronous and asynchronous communication channels; (c) enabling the customer to select one of the one or more eligible communication channels during the communication session; and (d) pivoting the customer to the selected one of the one or more eligible communication channels during the communication session. Other exemplary embodiments and implementations are disclosed herein.

DETAILED DESCRIPTION

The following description is presented to enable any person skilled in the art to make and use the invention, and is provided in the context of particular applications of the invention and their requirements. Various modifications to the disclosed embodiments will be readily apparent to those skilled in the art and the general principles defined herein may be applied to other embodiments and applications without departing from the scope of the present invention. Thus, the present invention is not intended to be limited to the embodiments shown, but is to be accorded the widest scope consistent with the principles and features disclosed herein.

Figure 1:
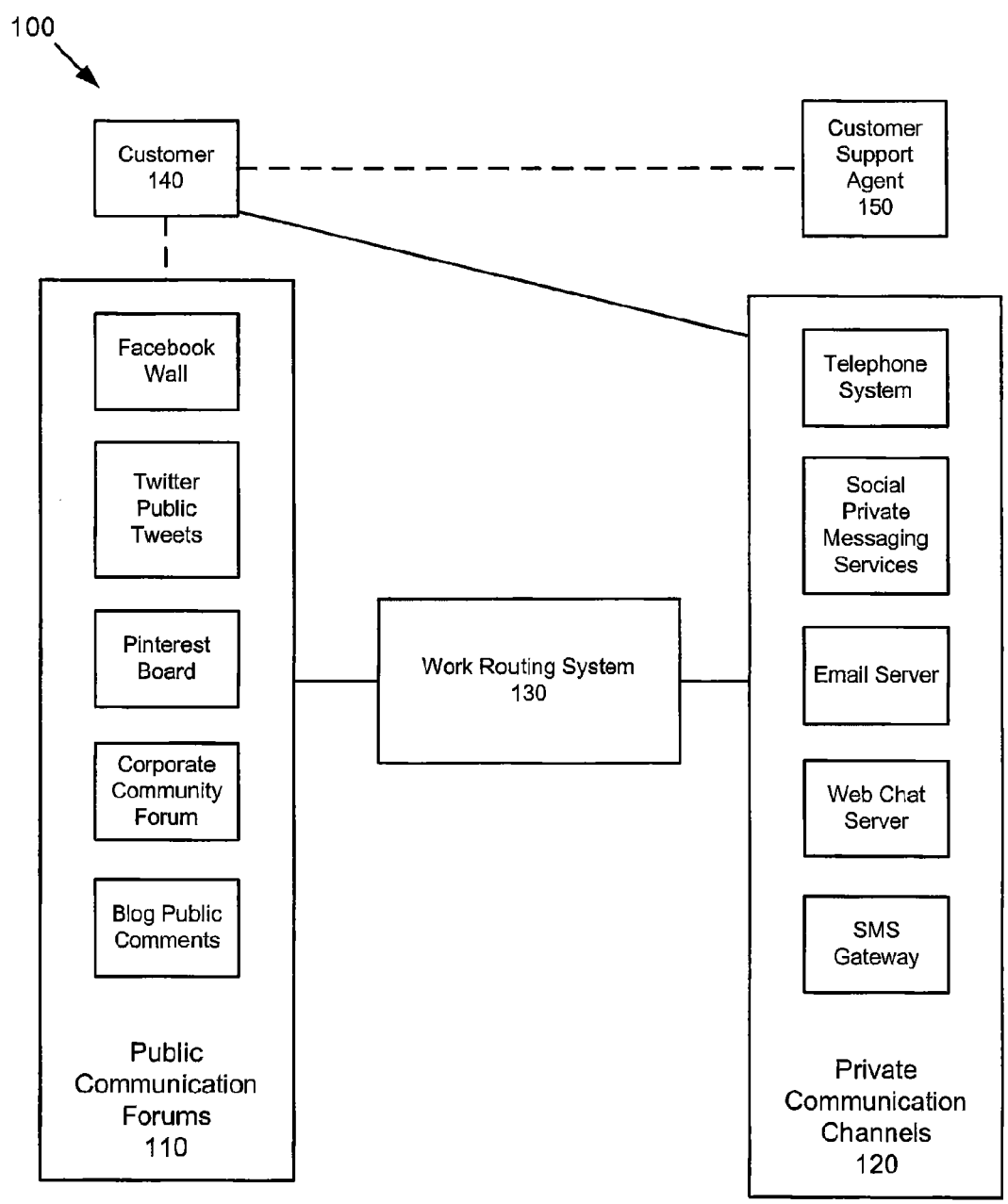
FIG. 1 illustrates an exemplary system for automatic multi-channel pivoting.

FIG. 1 illustrates an exemplary system for multi-channel pivoting during a communication session. The exemplary system 100 includes public communication forums 110, private communication channels 120, and a work routing system 130 coupled to the forums and the channels for facilitating a communication session between a customer 140 and a customer support agent 150. The public communications forums 110 include, without limitation, Facebook wall, Twitter public tweets, Pinterest board, corporate community forum, blog public comments, and/or other public forums. The private communication channels 120 include, without limitation, telephone system, social private messaging services, email server, web chat server, SMS gateway, and/or other private communication channels.

Figure 2:
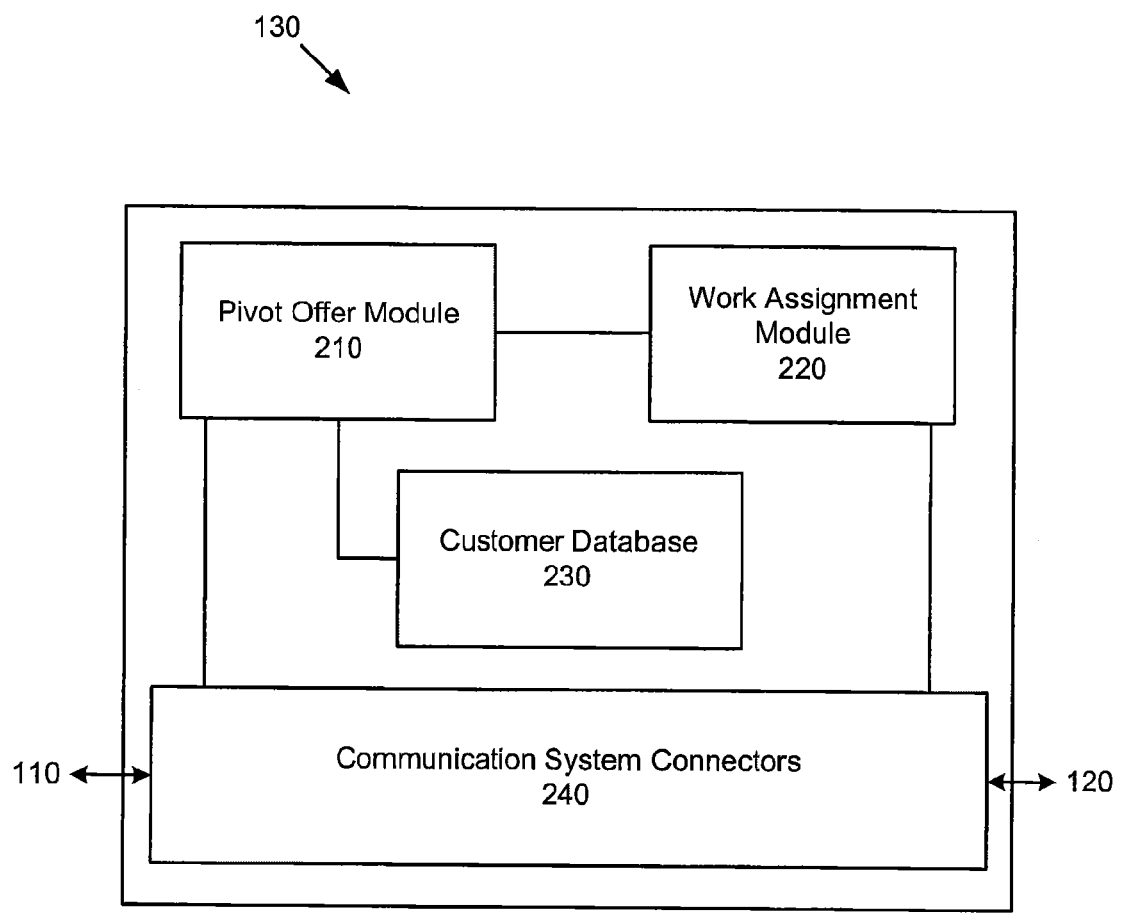
FIG. 2 illustrates an exemplary work routing system for facilitating multi-channel pivoting.

FIG. 2 illustrates an exemplary work routing system 130. The work routing system 130 includes a pivot offer module 210, a work assignment module 220, a customer database 230, and communication system connectors 240. The communication system connectors 240 include multiple connectors for communications with both the public communication forums 110 and private communication channels 120.

Figure 3:
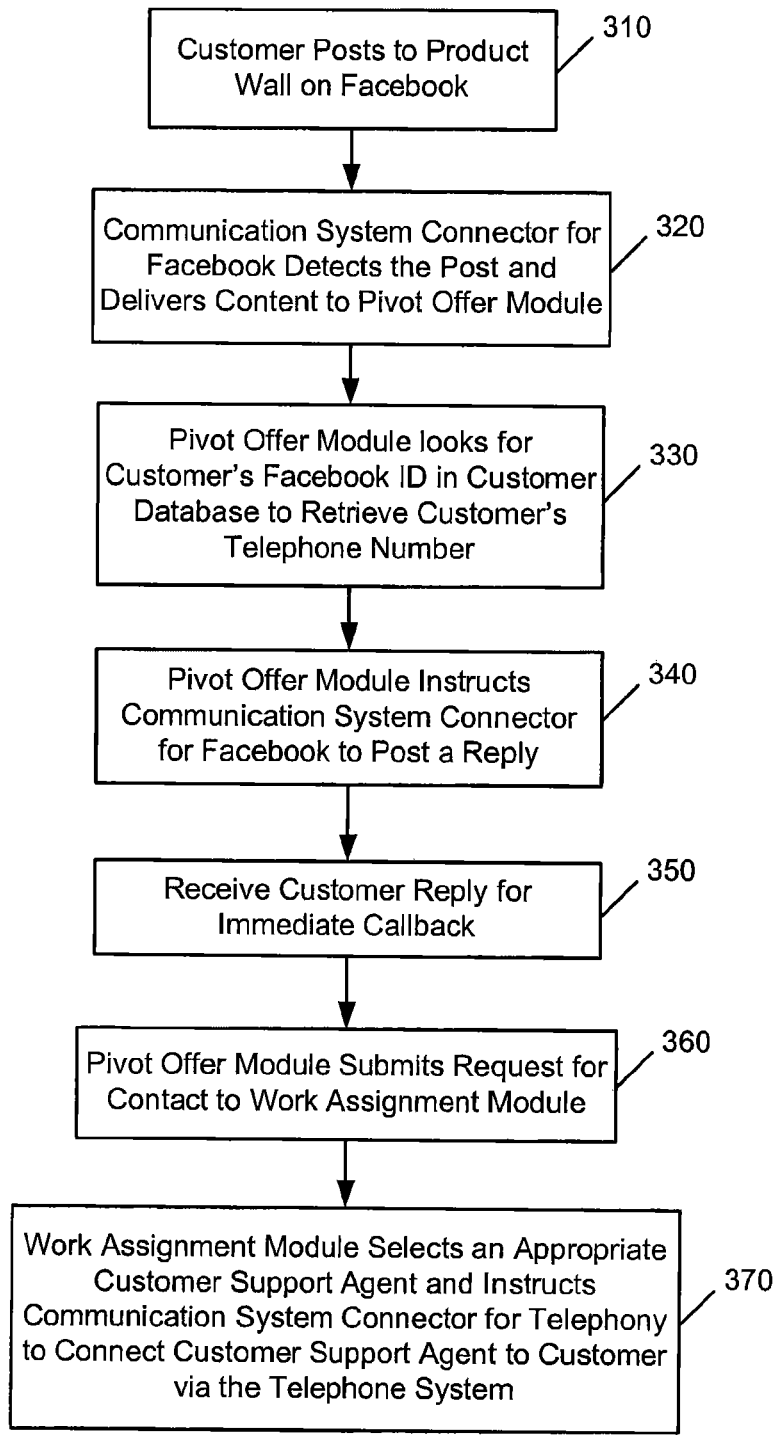
FIG. 3 illustrates an exemplary process for pivoting among multiple channels during a communication session.

FIG. 3 illustrates an exemplary process for pivoting among multiple-channels during a communication session between the customer 140 and the customer support agent 150.

At block 310, the customer 140 posts a communication to a product wall on Facebook in the public communications forums 110.

At block 320, the communication system connector for Facebook 240 detects the public post and delivers its content to the pivot offer module 210.

At block 330, the pivot offer module 210 looks for the customer's Facebook ID in the customer database 230, finds the customer, and retrieves the customer's telephone number.

At block 340, the pivot offer module 210 instructs the communication system connector for Facebook 240 to post a reply on the customer's comment. In exemplary implementation, the content of the reply asks the customer 140 to reply with either a "Yes" or "No" for an immediate callback from an agent.

At block 350, the customer's reply for an immediate callback is received by the communication system connector for Facebook 240 and is conveyed to the pivot offer module 210.

At block 360, the pivot offer module 210 submits a request for contact to the work assignment module 220.

At block 370, the work assignment module 370 selects an appropriate customer support agent 150 and instructs the communication system connector for telephony 240 to connect the customer support agent 150 to the customer 140 via the telephone system in the private communications channels 120.

Customer support agent 150 and customer 140 continue the same communication session via a different communication channel to engage in a private discussion. The process FIG. 3 is merely exemplary. For example, the work assignment module 370 may instruct the communication system connector to connect the customer to anyone of the available communication channels, whether or not a voice channel, depending on the specific circumstances relating to the communication session.

In an exemplary implementation, during a communication session with a customer, the work routing system 130 enables pivoting seamlessly from a public channel to a private channel and further enables seamless pivoting among multiple private channels (e.g., the private communication channels 120), whether synchronous or asynchronous. Synchronous channels include, without limitation, voice channels and web chat channels. Asynchronous channels include, without limitation, email, blog, tweet, text message, and others. In general, a public channel is a channel accessible by more than the parties involved in the communication session (e.g., may be viewable by the public at large). A private channel typically is accessible by only the parties involved in the communication session.

The system enables both the customers to choose a preferred channel most meaningful to them and companies to choose the channel most optimized for each customer from a choice of channels. For example, low-value customers may never be offered a voice channel.

In an exemplary implementation, a set of eligible communication channels are selected based on a value score assigned to a customer. A value score may be determined based on data from an external data source and/or data in the customer database 230.

Figure 4:
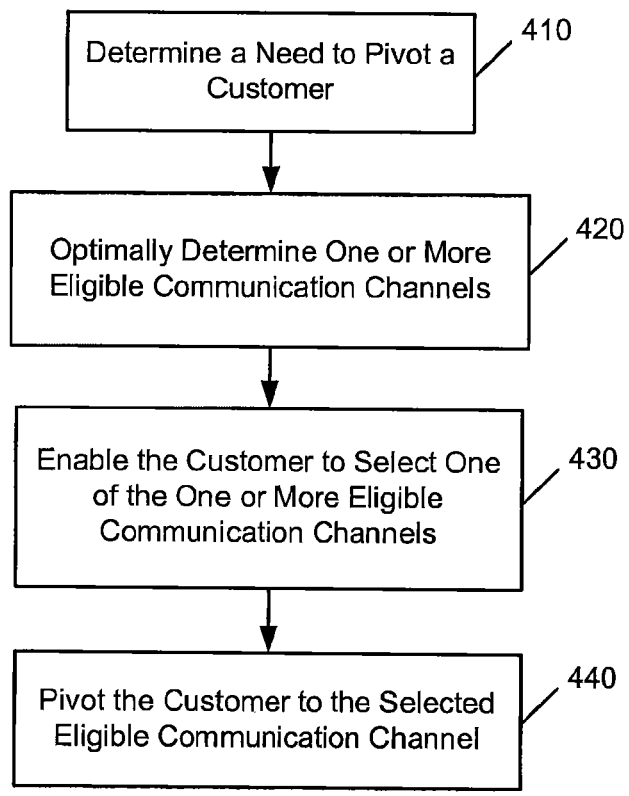
FIG. 4 illustrates an exemplary process for pivoting a customer among synchronous and asynchronous communication channels during a communication session.

FIG. 4 illustrates an exemplary process for pivoting a customer among synchronous and asynchronous communication channels during a communication session.

At block 410, during a communication session with a customer, an agent 150 or the work routing system 150 may determine a need to pivot a customer from a first communication channel to a second communication channel. The need may be determined based on many factors including, without limitation, automatically based on keyword analysis, automatically based on business rules, dynamically by the agent participating in the communication session, based on at least one prior interaction with the customer, and/or other factors. In an exemplary implementation, the first communication channel is a public channel and the second communication channel is a private channel At block 420, the work routing system 130 optimally determines one or more eligible communication channels based on data related to the customer. In an exemplary implementation, the eligible communication channels may include synchronous and asynchronous communication channels. For example, based on a value score assigned to a customer, at least one synchronous channel becomes an eligible communication channel if the value score is higher than a threshold value or at least one asynchronous channel becomes an eligible communication channel if the value score is lower than a threshold value.

At block 430, the work routing system 130 enables the customer to select one of the one or more eligible communication channels during the communication session. In an exemplary implementation, a choice for one or more eligible communication channels is displayed to the customer.

At block 440, the work routing system 130 pivots the customer to the selected one of the one or more eligible communication channels during the communication session. The pivoting may be facilitated based on customer input, automatically upon customer selection, undetectable by the customer, or by other implementations depending on design choice.

Exemplary Operating Environments

The program environment in which a present embodiment of the invention is executed illustratively incorporates a general-purpose computer or a special purpose device such as a hand-held computer. Details of such devices (e.g., processor, memory, data storage, display) may be omitted for the sake of clarity.

It should also be understood that the techniques of the present invention may be implemented using a variety of technologies. For example, the methods described herein may be implemented in software executing on a computer system, or implemented in hardware utilizing either a combination of microprocessors or other specially designed application specific integrated circuits, programmable logic devices, or various combinations thereof. In particular, the methods described herein may be implemented by a series of computer-executable instructions residing on a suitable computer-readable medium. Suitable computer-readable media may include volatile (e.g., RAM) and/or non-volatile (e.g., ROM, disk) memory.

The foregoing embodiments of the invention have been presented for purposes of illustration and description only. They are not intended to be exhaustive or to limit the invention to the forms disclosed. Accordingly, the scope of the invention is defined by the appended claims, not the preceding disclosure.

What is claimed is:

1. A computer-implemented method for pivoting a customer among synchronous and asynchronous communication channels during a communication session, comprising:
    during a communication session with a customer, receiving via a communication connector a communication from the customer from a first communication channel, wherein the first communication channel is a public channel accessible and viewable by more than parties involved in the communication session;
    automatically determining one or more eligible second communication channels based on data related to the customer, said eligible second communication channels including synchronous and asynchronous communication channels, wherein the second communication channels are private channels accessible by only the parties involved in the communication session;
    enabling the customer to select one of the one or more eligible second communication channels during the communication session; and
    automatically pivoting the customer from the first communication channel to the selected one of the one or more eligible second communication channels during the communication session.

2. The method of claim 1, wherein said need is determined automatically based on keyword analysis.

3. The method of claim 1, wherein said need is determined automatically based on business rules.

4. The method of claim 1, wherein said need is determined dynamically by an agent participating in the communication session.

5. The method of claim 1, wherein said need is determined based on at least one prior interaction with the customer.

6. The method of claim 1, wherein said data related to the customer includes a value score assigned to the customer.

7. The method of claim 6, wherein at least one synchronous channel becomes an eligible communication channel if the value score is higher than a threshold value.

8. The method of claim 6, wherein at least one asynchronous channel becomes an eligible communication channel if the value score is lower than a threshold value.

9. The method of claim 1, wherein said data related to the customer include data from at least one prior interaction with the customer.

10. The method of claim 1, further comprising displaying said determined one or more eligible communication channels to the customer.

11. The method of claim 1, wherein said pivoting is performed based on a customer input.

12. The method of claim 1, wherein said pivoting is performed automatically upon customer selection.

13. The method of claim 1, wherein said pivoting is undetectable by the customer.

14. A communications system for pivoting a customer among synchronous and asynchronous communication channels during a communication session, the system comprising:
    a pivot offer module coupled to a customer database; and
    a plurality of communication system connectors for connecting to public and private communication channels;
    wherein the pivot offer module being configured to:
        receive a communication from a customer during a communication session from a public channel through the communication connectors, wherein public channel accessible and viewable by more than parties involved in the communication session;
        determine the customer's value score based on data in the customer database;
        offering one or more eligible private communication channels to the customer through the communication system connectors, wherein the private communication channels are accessible by only the parties involved in the communication session;
        receiving a response from the customer indicating a selection; and
        pivoting the communication session from the public channel to one of the private channels based on the selection.

15. The system of claim 14, further comprising: a work assignment module coupled to the pivot offer module; wherein said work assignment module is configured to:
    select a customer support agent; and
    instruct the communication system connectors to connect the customer support agent to the customer via a telephone system.

\* \* \* \* \*